United States Patent [19]

Henkel

[11] Patent Number: 5,048,681

[45] Date of Patent: Sep. 17, 1991

[54] ENVELOPE STORAGE FOR COMPACT DISCS

[76] Inventor: Walter R. Henkel, 711 John St., Secaucus, N.J. 07094

[21] Appl. No.: 550,134

[22] Filed: Jul. 9, 1990

Related U.S. Application Data

[63] Continuation-in-part of Ser. No. 344,246, Apr. 27, 1989, abandoned.

[51] Int. Cl.$^5$ .............................................. B65D 85/30
[52] U.S. Cl. .................................... 206/312; 206/313; 206/444
[58] Field of Search ............................... 206/309–313, 206/444

[56] References Cited

U.S. PATENT DOCUMENTS

| | | | |
|---|---|---|---|
| 2,777,574 | 1/1957 | Brody | 206/313 |
| 4,042,106 | 8/1977 | Smith | 206/313 |
| 4,473,153 | 9/1984 | Colangelo | 206/312 |
| 4,762,225 | 8/1988 | Henkel | 206/444 |
| 4,850,731 | 7/1989 | Youngs | 206/313 |
| 4,863,032 | 9/1989 | Bothe et al. | 206/444 |

FOREIGN PATENT DOCUMENTS

| | | | |
|---|---|---|---|
| 8509 | 3/1986 | Japan | 206/313 |
| 341013 | 10/1959 | Switzerland | 206/311 |
| 1055964 | 1/1967 | United Kingdom | 206/313 |
| 1072844 | 6/1967 | United Kingdom | 206/313 |

Primary Examiner—William I. Price

[57] ABSTRACT

Envelopes are a cost-effective storage means for Compact Discs. However, special problems arise with respect to the sensitive optical surface. Disclosed is a unique envelope/cushion configuration which can be used to minimize or, to elmininate almost entirely, abrasion and chafing, depending on the exact manner of use. A special thin cushion that combines the qualities of surface softness with an underlying stiffness, shares the envelope with the disc. In the preferred usage, disc and cushion are inserted or removed simultaneously, so that no relative movement or chafing takes place between them, and the disc does not contact the rear wall of the envelope. Buckling of the otherwise thin cushion is controlled by its stiffness, by low friction, and by the confined space between envelope wall and disc.

The envelope may be designed with greater fullness than usual since the cushion expands and stabilizes the disc, once released within the envelope, so that access is greatly improved. Even when the cushion is left permanently in place, it nevertheless reduces the chafing and abrasion considerably, and augments the improved access which has been provided in the envelope pocket.

Several envelope and cushion configurations are presented which exhibit the concept and which are amenable to generic display and packaging. The construction optimizes cost-effectiveness with respect to such original, point-of-purchase packaging.

18 Claims, 10 Drawing Sheets

ENVELOPE STORAGE FOR COMPACT DISCS

This is a continuation-in-part of Ser. No. 07/344,246 filed 04/27/89, and now abandoned.

FIELD OF THE INVENTION

The present invention relates to original, point-of-purchase packaging for Compact Discs that is later used as a storage medium, and which is amenable to low-cost, generic production.

BACKGROUND OF THE INVENTION

From U.S. Pat. No. 4,762,225 there is known a method for storing and protecting a plurality of Compact Discs, wherein they rest against a series of 'V' shaped storage cushions which, themselves rest within a gusseted outer jacket, for containment and security. In this arrangement, the discs may be separately accessed or replaced without relative, abrasive movement against the sensitive optical surfaces. The functions of containment, versus stabilization and surface protection, have been mutually separated, with the cushion arrangement opening widely to receive the discs, and with the discs resting 'against' the cushions, rather than 'within' protective envelopes. In addition, there is compensation for the widely varying volume, with stiffness in the cushion substrate urging an equilibrium volume of air to reside within polymer layers that form the sleeve of the cushions, and this stabilizes the discs without interfering with access.

In another reference, U.S. patent application Ser. No. 07/264,436, now abandoned, the present inventor discloses a method for the construction of a highly resilient envelope with low pocket and foldover cover that exhibits exceptional qualities of openness, flexibility, and easy access, while yet retaining strength and structural integrity. Said application discloses the use of a cushion insert to compensate for openness and to stabilize the disc in the pocket, so that greater openness is achieved without loss of control. The cushion is shown in flexible attachment to the envelope and, due to its compressability and low friction, reduces abrasion on the optical disc surface. This result is further improved in the present application which discloses a detached cushion, capable of being moved together with the disc as a unit, so as to eliminate chafing almost entirely. The importance of fullness in the envelope is further emphasised with the use of multiple, parallel creases, discussed in the earlier application and illustrated further herein, and with the use of an extremely flexible polymer film sleeve envelope and stiffener.

It may be noted that there is a fundamental design conflict between access and stability, which is addressed by the inventive construction. It is within this context that the current improved storage means is disclosed.

The inventive construction has an objective, to provide a low-cost means to package and display, as an original article for sale, a single Compact Disc, with the essential parts of the package to be retained after purchase for attractive and servicable storage and collection.

The objective further extends to the low-cost versions of the Compact Disc known as 'CD-singles' which usually contain one or several titles in a manner analogous with 45 rpm records.

SUMMARY OF THE INVENTION

In the marketing of the so-called 'CD-singles', the factor of cost is very controlling, so that the ideas underlying said U.S. Pat. No. 4,762,225 require modification to achieve an optimal design. Among the added requirements may be, typically, a preference for totally generic packaging, relying upon the indicia which are printed on the disc itself, rather than requiring even simple supplemental printing of titles on the outer jacket. Another requirement is the reduction of cost associated with the production of the outer jacket, which may require the elimination of the gusseted sides altogether. Also, the cushion may be other than that previously described.

For the purpose of extending the general concepts of the earlier said patent into the present context, several alternative constructions are presented, which optimize the relation between access and stability, yet meet the requirements regarding generic use and production costs.

One of these constructions uses a low-pocket envelope with a foldover cover. The open design makes access very available, even by 'touch' alone, and it works well in a 'flip-through' type storage collection.

In another construction, a transparent polymeric envelope is employed which, due to its flexibility, acts analogously with the low-pocket design in providing access. The pocket may be of full height, owing to the increased flexiblity, and therefore does not require a foldover cover to avoid interference in a flip-through collection. A great advantage for generic packaging, in this design, is the ability to view the disc indicia through the transparent film, without having to provide a die-cut window, or labeling, as required with the foldover cover design. A separate stiffening panel may then be employed to guide the cushion and to increase the tendency for closure in the otherwise highly flexible pocket.

In each case, an accessable pocket is coupled with a semi-rigid cushion to allow simultaneous access of disc and cushion together, and to prevent abrasion against the optical surface. In a manner analogous with the disclosure in the earlier stated U.S. Pat. No. 4,762,225, the disc rests 'against', rather than 'within', the protective cushion. This is in contrast with methods that require sliding within envelopes as part of the storage procedure.

An essential component of the construction is the semi-rigid cushion, which protects the optical surface and guides the disc, while avoiding abrasive contact. The rigidity and low friction work together to avoid buckling, as does the specific geometry.

It should be noted that, adherence to certain design criteria, disclosed in the detailed description of the invention, result in an optimized performance of the invention, and should be observed for achieving a successful trade-off of access and stabilization.

In the accompanying drawings and description, the nature of these factors will be explored and the manner of application in several different constructions will be illustrated and described in detail.

DESCRIPTION OF THE FIGURES

FIG. 4b is a perspective view of the same embodiment showing how a slight thumb pressure helps form a loop in the polymer film, which aids the corner-initiated access illustrated in FIG. 4a.

DRAWING REFERENCE NUMERALS 10 semi-rigid cushion
12 low pocket in foldover cover design
14 optical disc or like article
16 tabs for pocket
20 back wall of envelope
22 region of cushion contact
24 front wall of pocket
30 polymer sleeve of envelope
32 substrate/stiffening panel of envelope
34 loop induced for access
36 lip/extension on stiffening panel
38 die-cut window
40 sheet of card
42 line marked and/or perforated for cutting
44 notches on additional section, optionally heat sealed
46 top edge of additional envelope section
48 additional section of stiffening panel
50 final heat seal

DETAILED DESCRIPTION OF THE INVENTION

Figure 1:
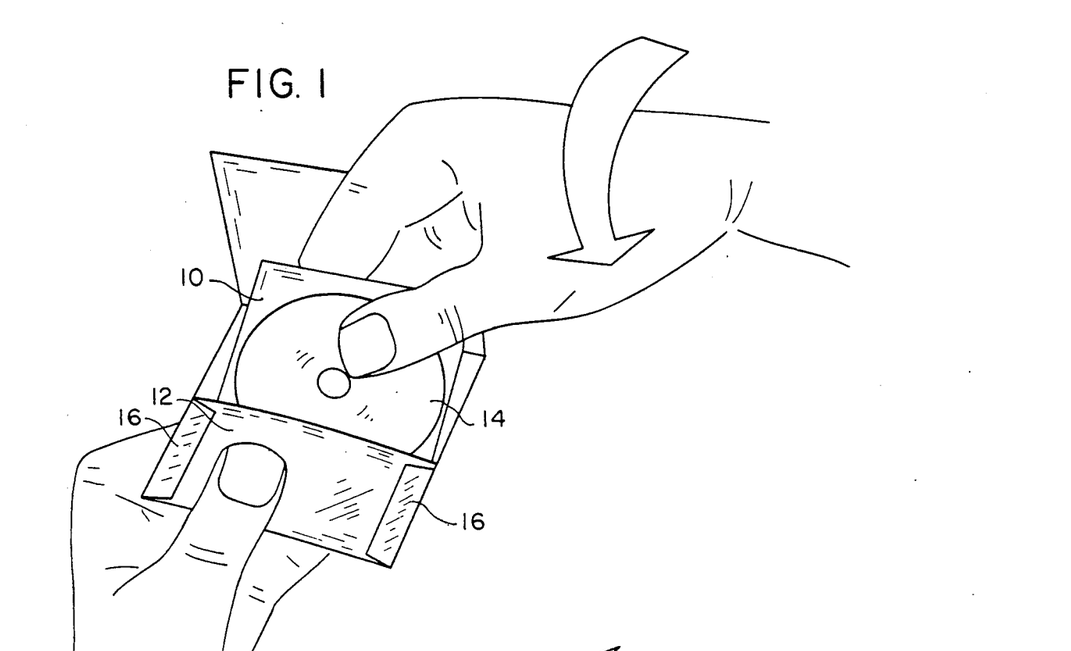
FIG. 1 is a perspective view of one embodiment, illustrative of the inventive construction. A wide, low-cut pocket in a foldover cover envelope works in concert with disc and cushion to minimize abrasion, with favorable torque applied as shown.
Figure 2:
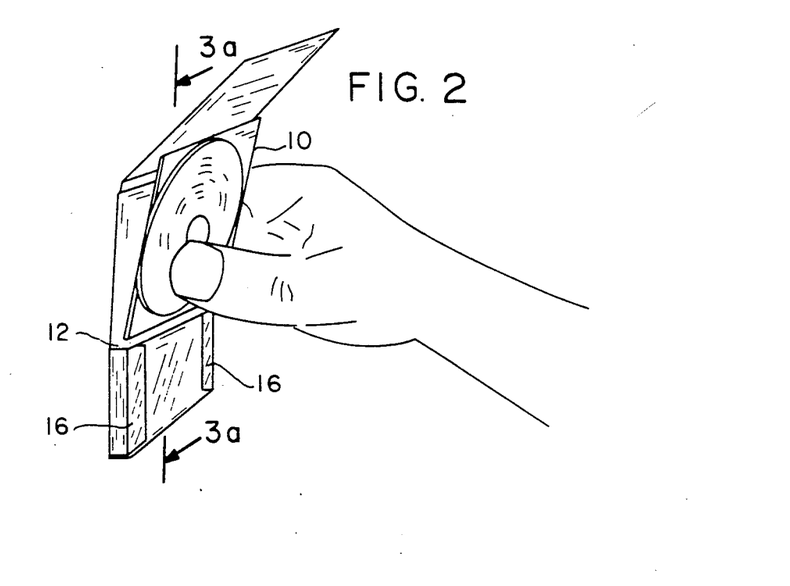
FIG. 2 is a perspective view similar to FIG. 1, with box-like folds for greater openness and gliding movement. Advantageous deployment of tabs is also visible.

With reference to the perspective views of FIG. 1 and FIG. 2 there is illustrated one embodiment of the inventive construction, in which a special cushion (10) and a low, open pocket (12) work together for protective storage of a disc (14). Tabs (16) are glued external to the pocket for increased strength and clearance in the pocket, and to avoid interference when used with other envelopes in a collection. FIG. 2 differs from FIG. 1 in that the pocket has been given a box-like shape, which further enhances openness and accessability of the pocket, which are desirable qualities within the context of the invention, as will be described. The pocket in FIG. 1 may be provided with extra openness by increasing its width and reducing its height, and is more easily manufactured than the box-like version, but otherwise the manner of use is the same.

Figure 3A:
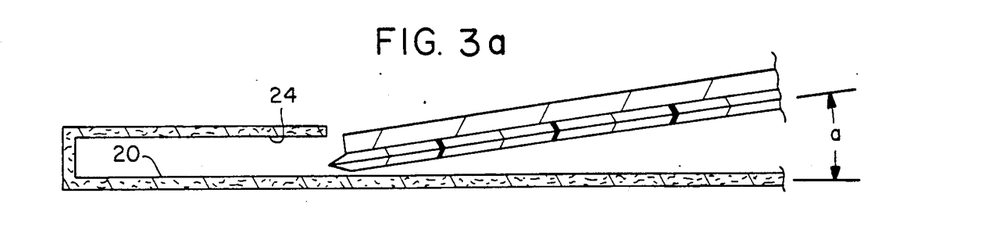
FIG. 3a is a simplified cross-sectional view of FIG. 2 showing disc and cushion at onset of insertion.

The extra openness in the box-like version serves to illustrate the principles underlying the inventive construction, and may be described with respect to the cross-sectional views in FIG. 3a through FIG. 3d. FIG. 3a is a simplified cross-sectional view taken along line 3a of FIG. 2, and shows the disc and cushion prior to insertion, with angle of insertion 'a' that is advantageous from the standpoint of the physical movement of the hands, which otherwise would not have enough clearance from the back wall of the envelope (20).

Figure 3B:
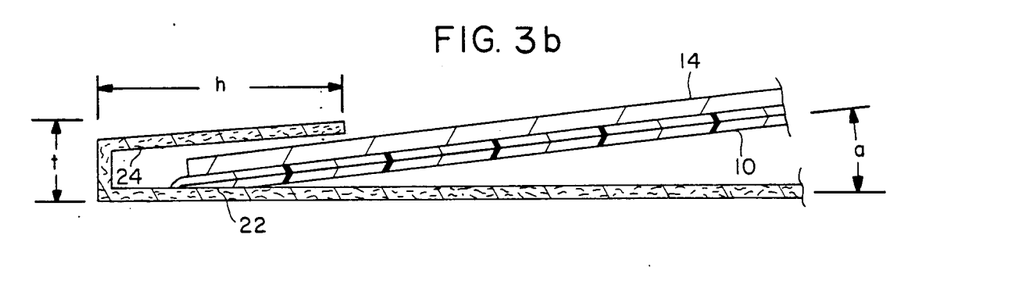
FIG. 3b is a simplified cross-sectional view of FIG. 2 similar to FIG. 3a, with disc and cushion deep within the pocket, showing how flexibility and openness in the pocket, and compression of the cushion, allow favorable access.

FIG. 3b shows further insertion of disc and cushion, where it now becomes apparent that the openness, in this case roughly defined by the ratio of thickness at the opening ('t') to the pocket height ('h'), t/h, is in direct correspondence with the angle 'a' of insertion possible as the disc and cushion are deep within the pocket. This quality is amplified by the compression of the cushion shown at (22) and the flexing of the front wall of the pocket, (24).

Figure 3C:
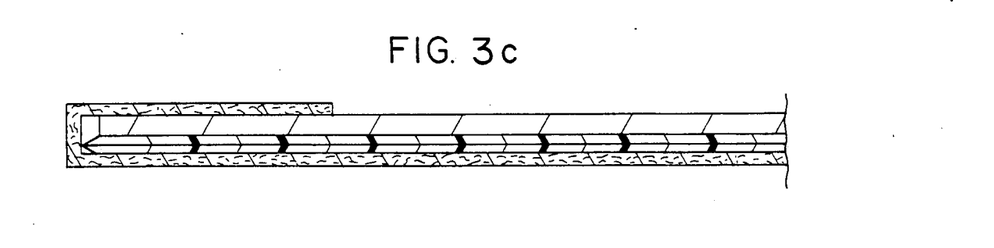
FIG. 3c is a simplified cross-sectional view of FIG. 2 similar to FIG. 3a, with disc and cushion in the fully inserted position, showing how the expanded cushion and relaxed envelope allow the disc to be stabilized within the otherwise shallow, widely open pocket.
Figure 3D:
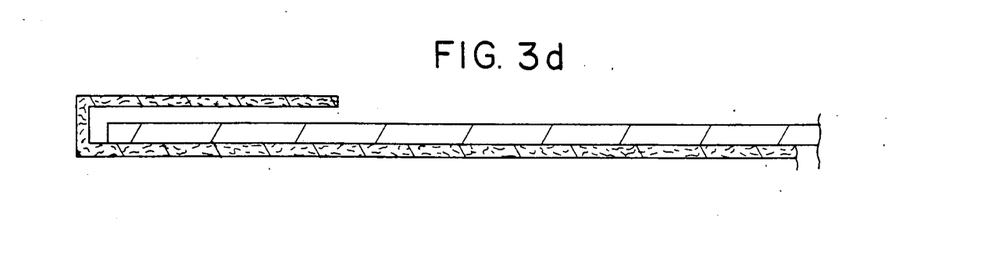
FIG. 3d is a simplified cross-sectional view of FIG. 2 similar to FIG. 3a, with the cushion removed, showing how the disc would remain unstabilized within the shallow, widely open pocket, emphasizing the importance of the cushion.

In the fully inserted position, FIG. 3c, the cushion expands and the envelope relaxes to conform with the disc which thus becomes constrained in a stabilized position. FIG. 3d shows, by way of contrast, how the disc would be unconstrained without the aid of the cushion, and emphasizes the relation of the cushion to the expanded pocket.

FIG. 1 indicates, as suggested by a large arrow, how a torque developed by wrist action, applies a compressive force on the cushion between the rear, interior wall of the envelope and the bottom edge of the disc, shown at (22) of FIG. 3b. This movement serves another function, which is to keep the leading edge of the cushion in contact with the rear wall of the envelope as it guides the disc. In this way, both cushion (10) and disc (14) glide together as a unit, so that no relative movement takes place between them, and no chafing or abrasion need act on the optical surface of the disc. One of the requirements that this imposes on the cushion is that, while it must be protectively soft, it must also have a semi-rigid quality so that it will not buckle when pushed forward in this manner. Several constructions will be covered in detail.

It may be noted that a fundamental novelty of the inventive construction lies in the resolution of the design conflict between the ease of access in a loosely fitting envelope, and the stability of a tightly fitting one. The semi-rigid cushion provides a means of stabilizing the disc and moving it, without abrasion to its optical surface, with the optical surface in face-to-face relation 'against' the cushion, rather than 'within' an inner envelope. This has the added advantage of making the top surface of the disc visible for reading of indicia.

Figure 4A:
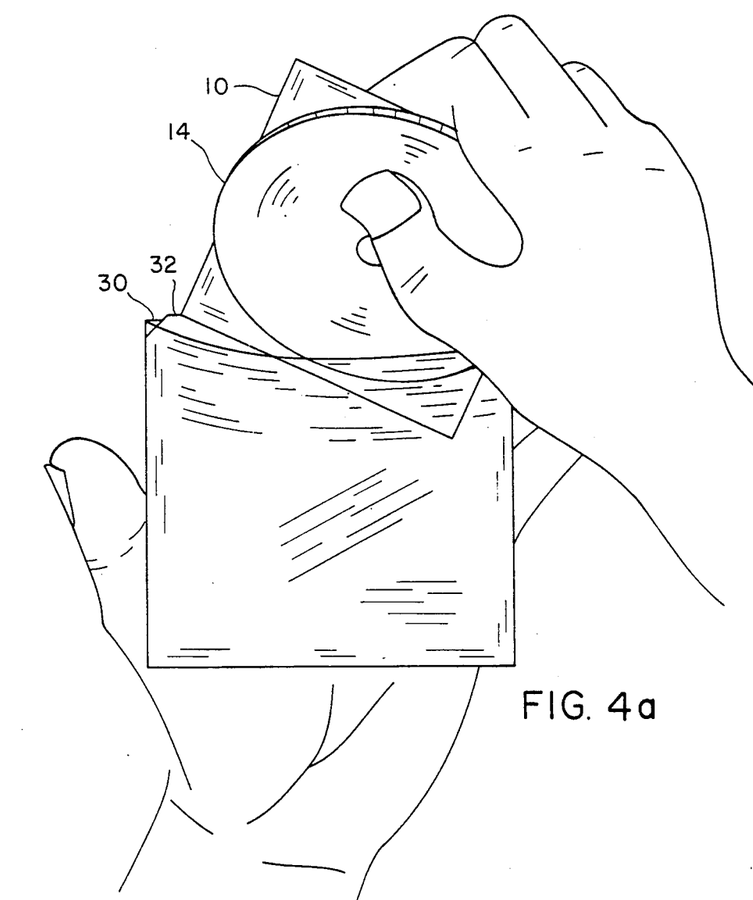
FIG. 4a is a perspective view of an alternate embodiment, illustrative of the inventive construction. An envelope formed from a polymer sleeve with an internal stiffening panel exhibits exceptional flexibility, which works in concert with disc and cushion to minimize abrasion, without loss of access or stability.
Figure 5:
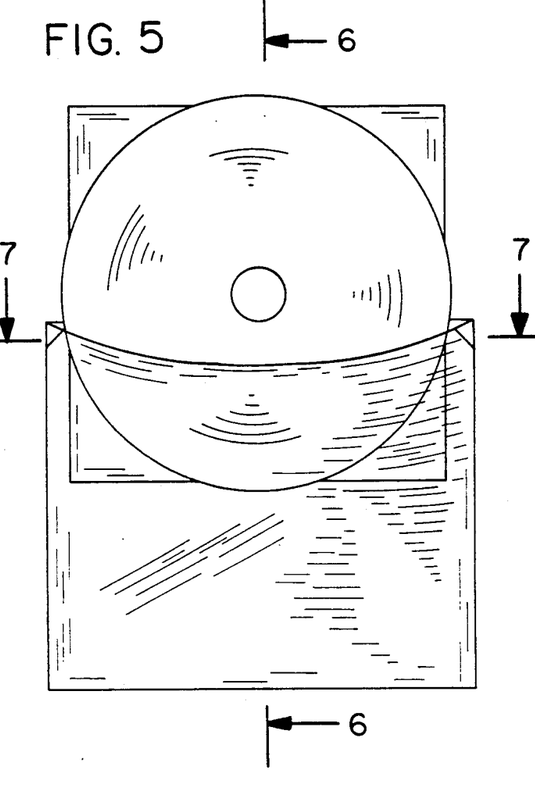
FIG. 5 is a front elevation of the same embodiment, useful with respect to the accompanying sectional views.

In this regard, other embodiments of fully or loosely cut envelopes may enjoy the same principle in balance with the semi-rigid cushion. In particular, the perspective view of FIG. 4a employs the use of an exceptionally flexible material such as a polymer film which, by itself, would be formless without the use of the inventive construction. FIG. 4a shows the use of a polymer sleeve (30), stiffened with an internal substrate (32), and used in concert with a semi-rigid cushion (10). The stiffener introduces a tendency to close the otherwise extremely flexible sleeve, and the cushion stabilizes the disc and protects its optical surface, as it is moved within the sleeve. These mechanics are shown in detail in FIG. 5 through FIG. 8, where FIG. 5 serves as a reference for the other sectional views.

Figure 4B:
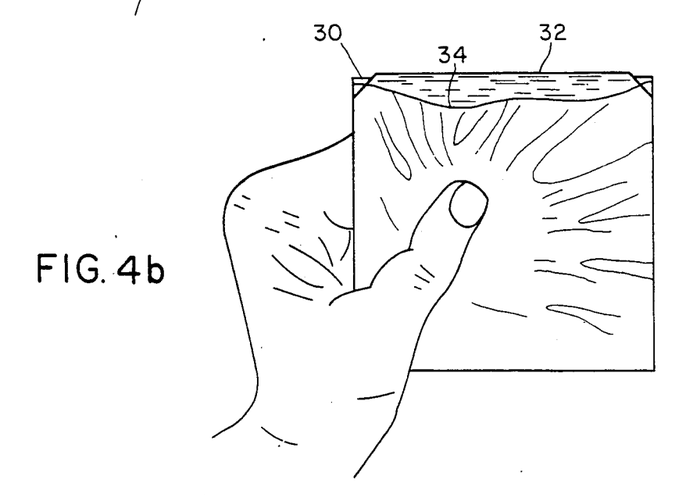
Figure 18:
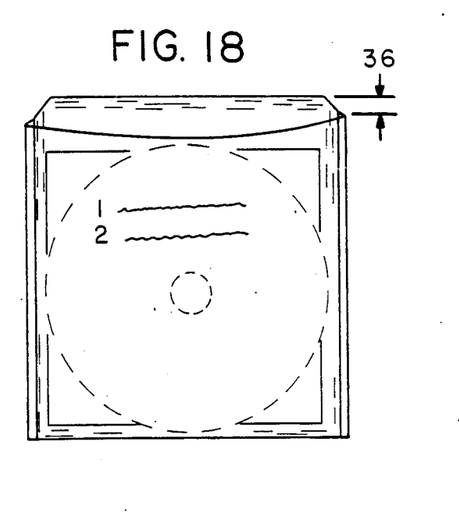
FIG. 18 is a perspective view of the polymer-sleeve type envelope with the lip of the stiffening panel extended, useful for easier initiation of insertion. The panel may be designed thus, or designed as before, and pushed slightly into this position just prior to access or return of the disc.

The stiffening substrate (32), resident in the sleeve, also serves to help initiate insertion, as seen in FIG. 4a, where the process is most easily performed at a corner, as shown. FIG. 4b shows how a slight thumb pressure on the sleeve surface draws it back and creates a small open loop (34) at the mouth of the sleeve, aiding in this process. FIG. 18 shows an extension or lip (36) on the stiffening panel which aids in this process as well, and this lip may be designed in the panel or may represent an action in which the panel is pushed slightly into this position just prior to access or return of the disc. These actions require some small measure of manual skill which is readily acquired during normal use.

Figure 6:
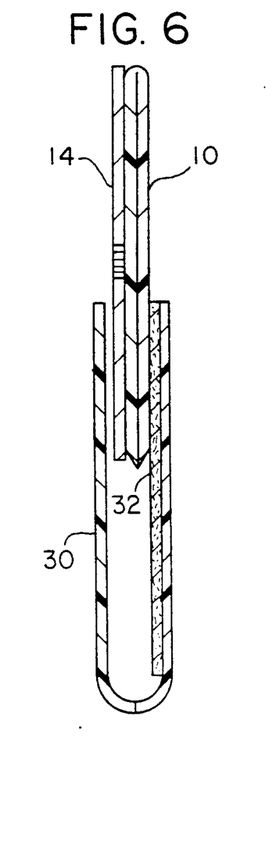
FIG. 6 is a side cross-sectional view of FIG. 5 showing the manner in which the cushion protects the optical surface of the disc during the long, sliding movement into the full-height pocket.

In FIG. 6 the drawer-like action of the cushion is visible as it effects access during a long, sliding movement in the full-height pocket, without this protection there would be considerable micro-abrasion to the optical surface. In addition to protecting the optical surface, the cushion also dampens out the otherwise uncontrolled movement of the disc, so that it glides in a stabilized manner.

Figure 7:
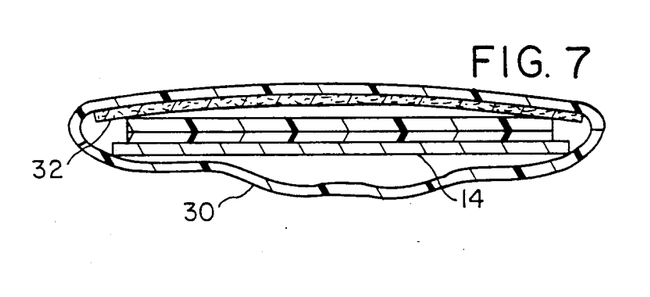
FIG. 7 is a top cross-sectional view of FIG. 5 showing the fullness available in the highly flexible polymer sleeve, and how it is regulated by the stiffening panel.
Figure 8:
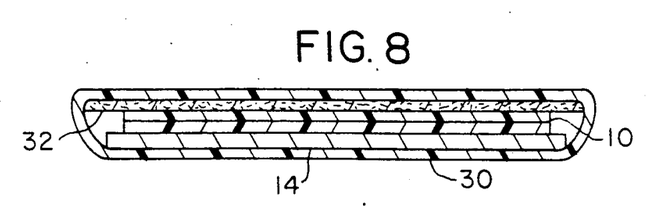
FIG. 8 is a top cross-sectional view of FIG. 12 (or FIG. 5 in the fully inserted, relaxed position) showing how the cushion helps to stabilize the disc by providing loft, wherein the sleeve tends to tighten slightly around the disc and substrate.

Extreme flexibility of the sleeve is balanced by the cushion and by the stiffening panel (32) as seen in FIG. 7 which shows how the cushion fills out the open space available within the envelope, increased by a slight 'bowing' out of the stiffening panel. FIG. 8 shows a sectional view in the fully inserted, relaxed position, which emphasizes the manner in which the cushion stabilizes the disc by providing loft and, in concert with the panel (32), stiffness that causes the sleeve to tighten slightly against the disc.

Figure 9:
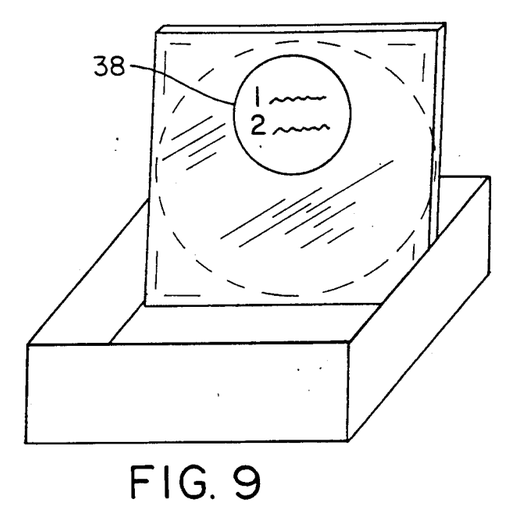
FIG. 9 is a perspective view of the foldover-cover embodiment with a die-cut window, showing how it is amenable to generic use in a flip-through collection.

The advantage of the inventive construction for generic packaging is illustrated in FIG. 9, 10, 11 and 12. FIG. 9 shows how the foldover cover design lends itself well to a flip-through type storage arrangement, with the cover protecting the low pockets against interference so that the individual members may easily slide in or out. Indicia printed on the disc may be viewed through a die-cut window (38), which takes advantage of the cushion lying against only one face of the disc. Simple, one-color printing or labeling would be an alternative to the die-cut window, without much additional cost.

Figure 11:
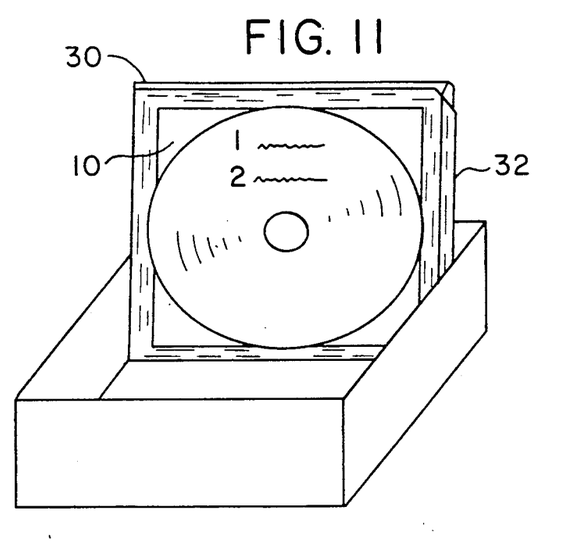
FIG. 11 is a perspective view of the polymer-sleeve embodiment with transparent face, showing how it is amenable to generic use in a flip-through collection, and how it may be turned with the opening to the side, for better storage characteristics.

FIG. 11 shows the corresponding flip-through storage arrangement when the envelope is of the polymer sleeve type. Indicia printed on the disc are readily viewable through the transparent front wall of the sleeve. The envelope is shown with the opening to the side, as this allows less interference in the flip-through arrangement, although the opening may optionally be disposed at the top as well. The stiffening panel is useful here to provide a stable shape for flipping-through, as well as for the reasons previously outlined.

Figure 10:
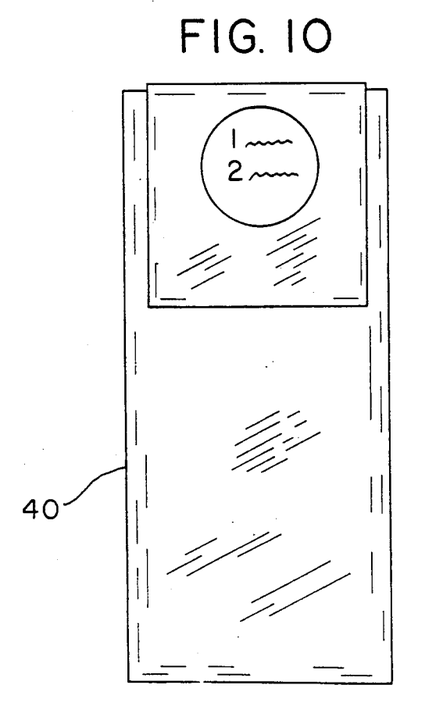
FIG. 10 is a front elevation of the foldover-cover embodiment, packaged with disc in saddle fashion with a sheet of card, for display and size-standardization.

FIG. 10 shows one method of packaging the foldover cover type envelope, wherein a sheet of card (40) is provided to meet dimensional standards, and the whole is shrink-wrapped or bag-sealed. The envelope is shown in saddle-like fashion over the card, so the card should also have a die-cut window to correspond with the envelope. If dimensions are not critical, the foldover cover may be shrink-wrapped without the card.

Figure 12:
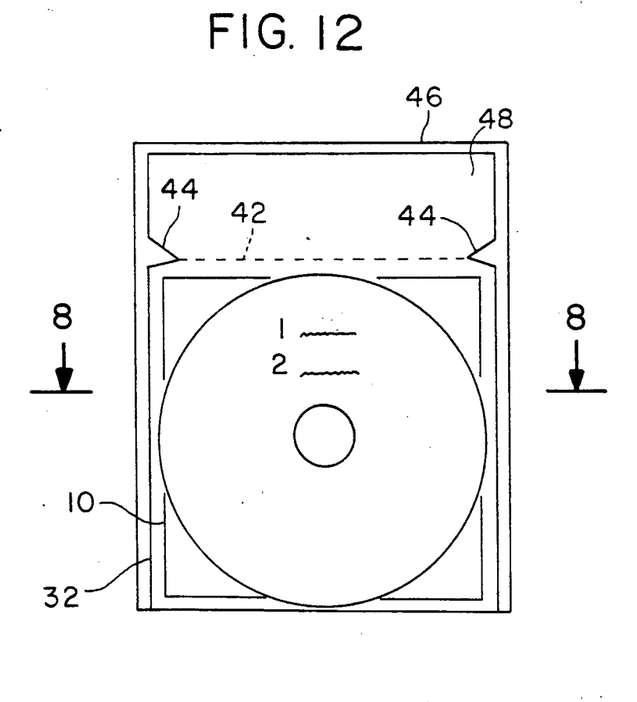
FIG. 12 is a front elevation of the polymer-sleeve embodiment packaged with an extension of the stiffening panel, so that a single cut may convert the package to a storage envelope, with a precise edge from the simultaneous cutting of sleeve and panel. Notches provide for, a possible, secondary seal, and for chamfering.
Figure 13A:
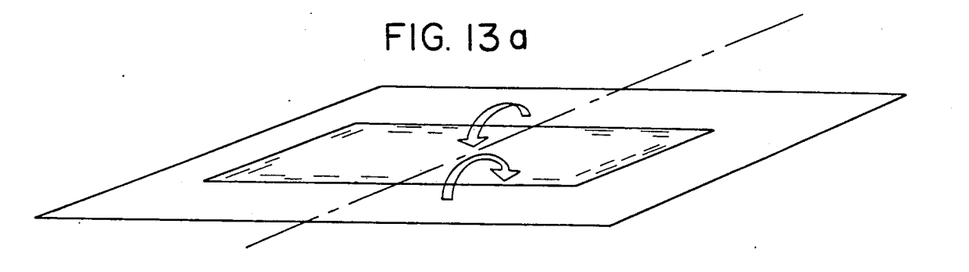
FIGS. 13a, 13b, 13c, 13d are perspective views of a sequence by which one embodiement of the cushion may be produced. Polymer film and fibre substrate may be folded, heat-sealed, and trimmed as indicated. Most heat seals will be hidden, and only single-sided printing/coloring of the substrate is required.
Figure 13B:
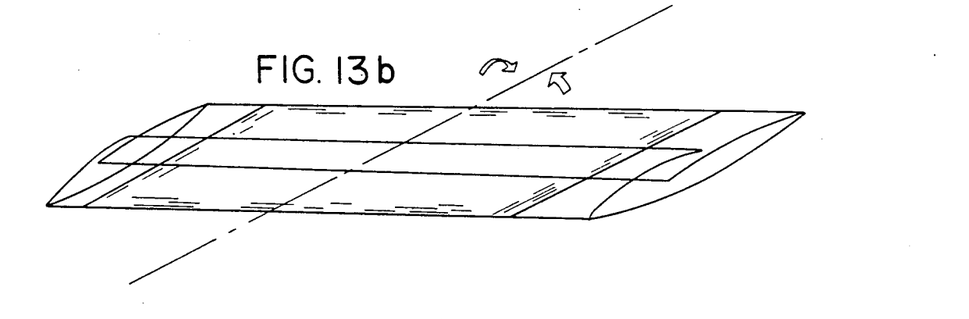
Figure 13C:
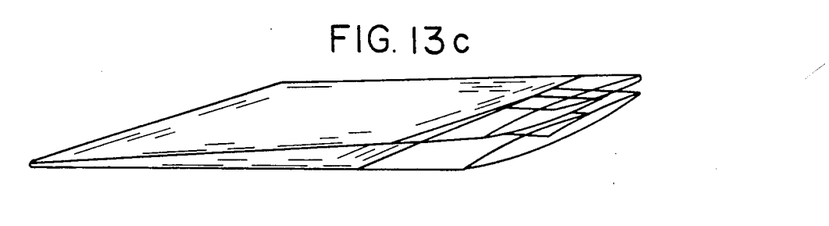
Figure 13D:
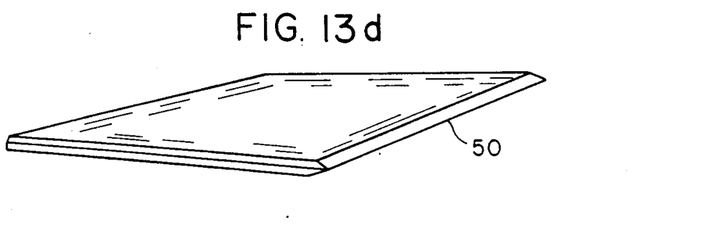

FIG. 12 shows how the polymer-sleeve envelope may be packaged to make it immediately convertable for use in a collection. The stiffening panel (32) is extended with an additional section (48), marked off by a dotted line which is optionally perforated (42). Notches (44) are provided at either end for chamfering and to allow secondary heat-sealing for more secure constraint of the disc. The primary closure is provided at the top edge (46) and may be either heat sealed or stapled, which allows for simple packing.

After purchase, the package is opened by a single scissor cut along the indicated line. Owing to the underlying panel, the edges of the polymer sleeve will be severed cleanly and precisely, and due to the notches, the corners will be nicely chamfered. Optionally, the extended panel section may be kept short, and the package displayed with this section to the side, as previously discussed, to alert buyers to that orientation for storage. In either case, the construction allows for a minimum of waste, with only a small section discarded, and is very cost-effective for production and packing.

Yet another option with the polymer-sleeve envelope, as noted, is to provide the stiffening panel with a small lip (36) as seen in FIG. 18, which increases the ease of initiating return of disc to envelope. Envelope with disc may be packaged within a transparent bag sealed at its top edge.

Finally, the success of the method depends upon the design of a cushion with the required properties, and several alternate constructions are disclosed. The desirable qualities include, relative stiffness to resist buckling, surface softness to protect the disc, low friction to glide freely without buckling, low in cost to manufacture, and being physically and chemically stable and inert so as not to damage the disc by either melting, wearing, or chemically damaging with plasticizers and retained solvents. It is also desirable for the cushion to have loft and compressibility, so that the advantage in compensating for envelope fullness is maximized.

One such design is shown in FIGS. 13a–d in which an elongate rectangle of substrate, such as paper, is wrapped with a sheet of polymer film, typically polyethelene, which has the required properties as outlined above, and is heat sealed in a series of steps shown in FIGS. 13a through 13d. The resulting cushion has only one rough edge (50) and the substrate need be printed or colored on one side only. The substrate provides stiffness, magnified by the increased section modulus due to folding, and the film provides surface softness, low friction, and loft. These qualities are amplified by the trapping of thin layers of air within the cushion, which tends to adjust to an equilibrium value as disclosed in the earlier stated U.S. Pat. No. 4,762,225. The polymer film is also useful in that it may be wiped clean with a damp cloth, unlike other soft, yet less durabile materials.

Figure 14:
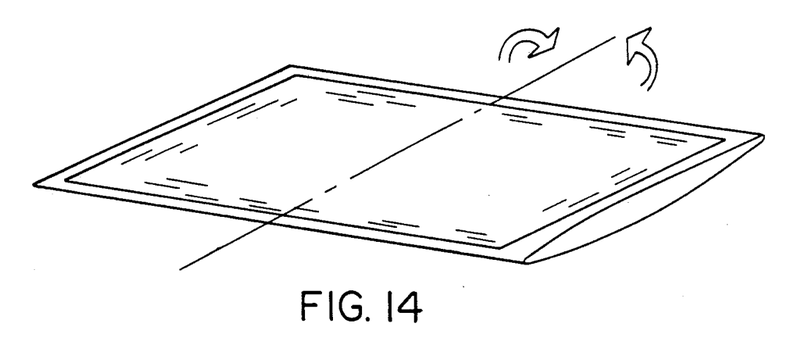
FIG. 14 is a perspective view of a means for producing the cushion wherein the fibre substrate is inserted into a polymer film sleeve, with the steps of FIGS. 13c, 13d performed as before.

Variations on the above idea are possible, such as one, illustrated in FIG. 14 in which a rectangular substrate is enclosed within a polymer sleeve, with the steps in FIGS. 13a through 13d being performed as before.

Figure 15:
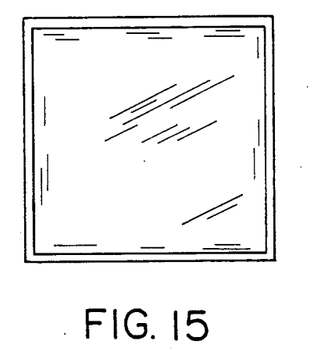
FIG. 15 is a front elevation of several cushion embodiments in which a square polymer sleeve element is sealed around a substrate that is squarely cut or folded.
Figure 16:
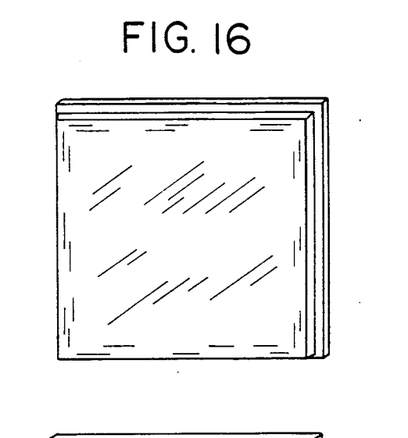
FIG. 16 is a perspective view of a cushion that comprises a layered composite.
Figure 17:
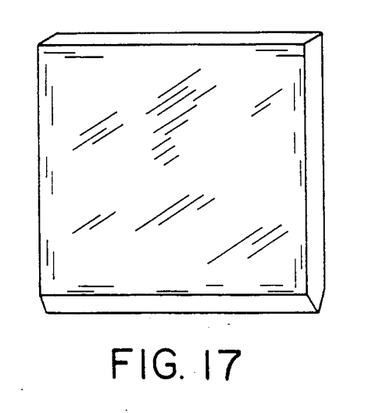
FIG. 17 is a perspective view of a cushion that comprises a panel of homogeneous, semi-rigid, soft material.

Another variation is to fold the substrate first, and then insert and seal in a square sleeve, FIG. 15, or to start with a square substrate and seal, or simply to employ a square of material which has in combination or in composite, the required properties of stiffness and softness and loft, as previously described. FIG. 16 shows how a substrate of card may be provided with a coating of a resilient material, such as a polymer foam. The card provides stiffness and easy sliding, while the surface coating protects the optical surface and provides loft for stabilization. FIG. 17 shows a cushion which comprises a semi-rigid foam material, sufficiently thick to prevent buckling, yet soft and resilient to protect and stabilize the disc. This involves a delicate trade-off in the elastic modulus of the material, relative to the thickness, since otherwise the required rigidity will be lost when achieving softness. By providing extra thickness, the bending resistance will be increased for a given elastic modulus, and a very cost-effective solution may be obtained. Tensile strength is also a factor in this design, since many materials which would otherwise qualify are too fragile for this application.

It should be mentioned that, in actual practice, the end-user may take advantage of the stabilizing and low-friction properties of the construction without removing the cushion completely from the envelope, and the envelope may be designed with the cushion in flexible attachment, as per said U.S. patent application Ser. No. 07/264,436. It is therefore desirable that the cushion be manufactured from the least abrasive materials available, anticipating this possible usage.

Figure 19:
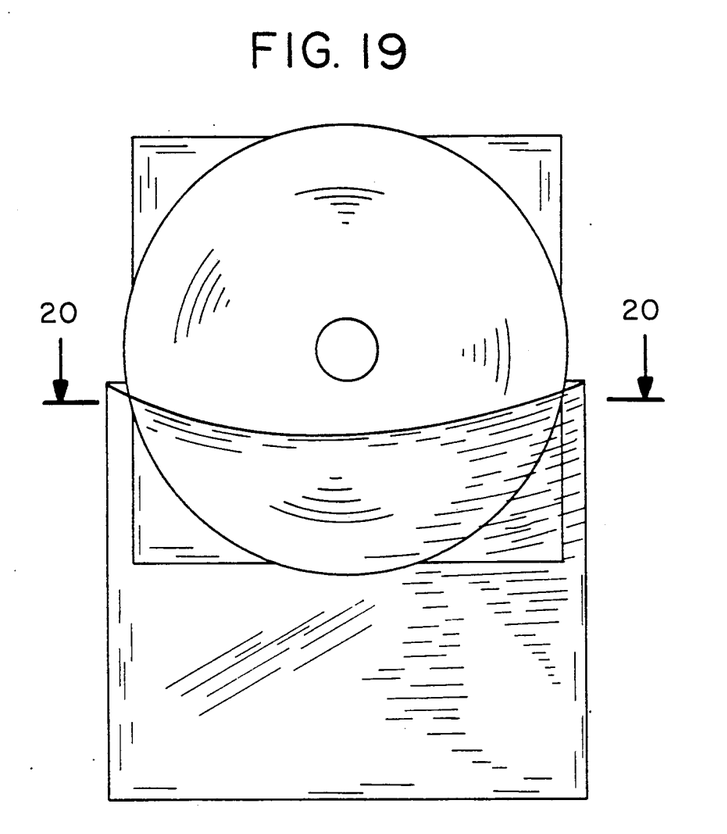
FIG. 19 is a front elevation of an alternative embodiment, similar to FIG. 5 but without an internal stiffening panel, with sleeve and cushion dimensions adjusted to optimize performance regarding access and stabilization.
Figure 20:
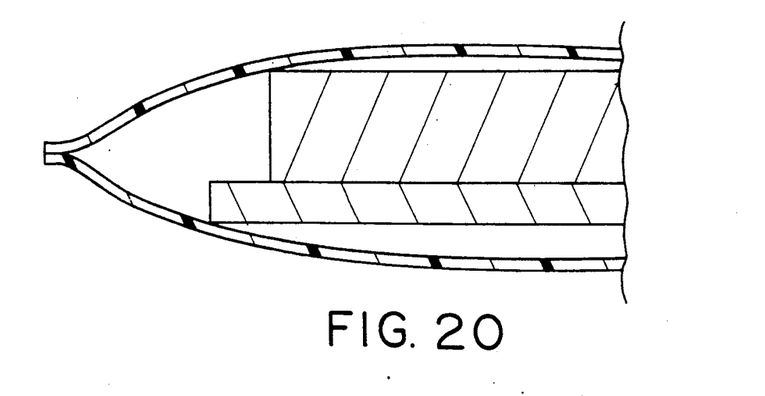
FIG. 20 is a partial, cross-sectional view of FIG. 19, showing detail of the optimized construction.

Another variant is to eliminate the stiffening panel entirely, as shown in FIG. 19, which, together with FIG. 20, depicts a design criterion that results in an optimization of the trade-off between ease of access, versus stability. FIG. 20 shows an optimal relation of disc, cushion, and sleeve that causes the sleeve to tighten against the edges of the disc, without cushion interference and without an unduly large requirement for cushion thickness. In this relation, the disc is stabilized, yet, glides easily within the sleeve, together with the cushion. As a result of direct experiment these requirements have been determined to approximate the following design formulae.

$$D_c \leq D_{cd} + 8 * t_{cd}$$

$$C_s \leq 2 * D_{cd} + 8 * [t_c + t_{cd}]$$

Where:
$D_c$ is the lateral dimension of the cushion,
$D_{cd}$ is the diameter of the compact disc
$t_{cd}$ is the thickness of the compact disc
$C_s$ is the internal circumference of the sleeve
$t_c$ is the thickness of the cushion These formulae derive from the following considerations.

Figure 21A:
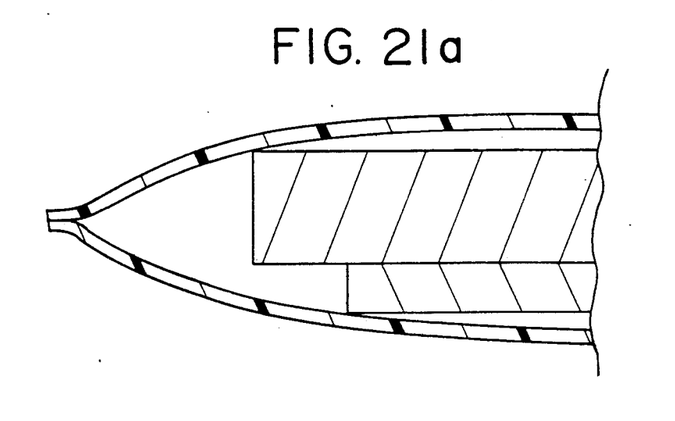
FIG. 21a is a cross-sectional view similar to FIG. 20, showing a typical case of inferior design due to incorrect cushion dimensions.

With respect to the first formula, when the width of the cushion exceeds the width of the compact disc by more than approximately four thicknesses of the compact disc, on either edge of the cushion, then the edge of the cushion begins to support the force that would otherwise be applied to the edge of the compact disc. It is this force which forms the major component of stabilizing friction, so that the normal technique of providing a cushion larger than the compact disc is not so effective as is this arrangement, and for illustration, the inferior design is shown in FIG. 21a.

Figure 21B:
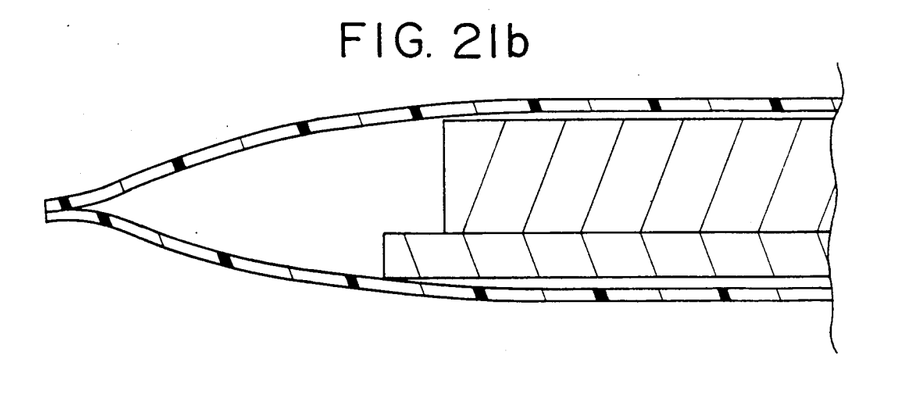
FIG. 21b is a cross-sectional view similar to FIG. 20, showing a typical case of inferior design due to incorrect sleeve dimensions.

With respect to the second formula, when the internal circumference of the sleeve is larger than the perimeter of a rectangle circumscribed around the disc and cushion combination, with the rectangle extending one and one-half times the combined thickness of disc and cushion on both sides of the disc, the requirement for increased cushion thickness becomes inordinate and an inferior design results, shown for illustration in FIG. 21b.

Figure 22:
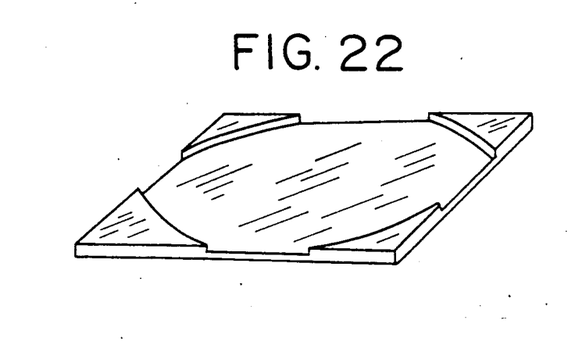
FIG. 22 is a perspective view of an alternative cushion in which a surface-wall has been impressed, whereby the disc may be further stabilized and whereby simultaneous access of disc and cushion is enhanced.

FIG. 22 gives yet another variant of the cushion, with a receiving-well that helps to stabilize the disc and move together with the disc as a unit. Depending on cushion width, the receiving-well may or may not extend beyond the edges of the cushion as shown, but the depth of the well becomes more critical in the latter case and needs to be sufficiently shallow to allow for sufficient stabilizing interference of the sleeve with the edges of the disc.

While there has been herein shown and described the preferred embodiments of the present invention, it is to be understood that the invention may be embodied otherwise than is herein illustrated and described and that in said embodiments, certain changes in the detailed construction and in the form and arrangement of parts may be made without departing from the underlying idea or principles of this invention within the scope of the appended claims.

I claim:

1. A packaging system for an optical informational disc, such as a compact disc, comprising:
  a) slideable, semi-rigid cushion means, disposed in face to face relation with the optical surface of said optical disc, capable of gliding together with said disc so that relative movement is eliminated between said disc and said cushion means;
  b) storage means, comprising a sleeve constrained in the dimension of its internal circumference to be within a small increment greater than the shortest closed arc circumscribing the face to face combination of said disc and said cushion means, said increment sufficiently small so that said combination interfers with the interior of said storage means to produce a pressure between one wall of said storage means, and the optical surface of said optical disc, said pressure urging the opposite and lateral walls of said storage means to tighten and pull fast against the outer edge and the non-optical surface of said optical disc;
whereby said disc is stabilized against adverse movement, and its optical surface is protected from the damaging effects of microscopic abrasion.

2. The system as recited in claim 1 in which said sleeve comprises a transparent polymeric material such as vinyl or polyethelene.

3. The system as recited in claim 1 in which said cushion means comprises a substrate of thin semi-rigid material such as paper, covered with a film of a polymer, such as polyethelene.

4. The system as recited in claim 3 in which said substrate is "V" shaped.

5. The system as recited in claim 1 in which said cushion means is "V" shaped.

6. The system as recited in claim 1 in which said cushion means comprises a substrate of polymer foam covered with a surface layer of a solid polymer.

7. The system as recited in claim 1 in which said cushion means comprises a sheet of polymer foam.

8. The system as recited in claim 1 in which said sleeve is heat sealed with said cushion means and said optical disc enclosed within.

9. The system as recited in claim 1 in which said sleeve is stiffened with an internal substrate of semi-rigid material, such as paperboard.

10. The system as recited in claim 1 in which said sleeve comprises a low pocket with a foldover cover.

11. The system as recited in claim 10 in which said pocket is formed by connecting a front panel and a rear panel with tabs that are external to the interior of said pocket.

12. The system as recited in claim 1 in which said sleeve has the shape of a thin, rectangular solid.

13. The system as recited in claim 1 in which said sleeve is provided with a viewing window.

14. A packaging system for an optical informational disc, such as a compact disc, comprising:
  a) slideable, semi-rigid cushion means, disposed in face to face relation with the optical surface of said optical disc, capable of gliding together with said disc so that relative movement is eliminated between said disc and said cushion means;
  b) storage means, comprising a sleeve capable of containing the face to face combination of said disc and said cushion means, said combination producing an interfering pressure between one wall of said storage means, and the optical surface of said optical disc, said pressure urging the opposite and lateral walls of said storage means to tighten and pull fast against the outer edge and the non-optical surface of said optical disc;
whereby said disc is stabilized against adverse movement, and its optical surface is protected from the damaging effects of microscopic abrasion.

15. The system as recited in claim 14 in which said storage means comprises a transparent polymer sleeve.

16. The system as recited in claim 14 in which said cushion means comprises a semi-rigid substrate covered with a soft material such as a polymer foam.

17. The system as recited in claim 14 in which said cushion means comprises a semi-rigid cushion with a surface-well capable of receiving said optical disc.

18. An improved storage package for an optical informational disc, such as a compact disc, of the type package in which said disc is to be slideably inserted and removed from a sleeve, said sleeve comprising a component of said package, said sleeve enclosing a semi-rigid cushion, wherein the improvement comprises adjusting the dimensions of said sleeve, cushion, and disc to conform approximately with the following limitations:

a) $D_c \leq D_{cd} + 8 \cdot t_{cd}$ b) $C_s \leq 2 \cdot D_{cd} + 8 \cdot [t_c + t_{cd}]$ where $D_c$ is the lateral dimension of the cushion,
$D_{cd}$ is the diameter of the compact disc,
$t_{cd}$ is the thickness of the compact disc,
$C_s$ is the internal circumference of the sleeve,
$t_c$ is the thickness of the cushion.

* * * * *